United States Patent
Mason et al.

(10) Patent No.: US 10,611,682 B2
(45) Date of Patent: Apr. 7, 2020

(54) PROCESS AND APPARATUS FOR MANUFACTURING BLOWN OPTICAL FIBRE UNITS

(71) Applicant: PRYSMIAN S.P.A., Milan (IT)

(72) Inventors: Mark Richard Mason, Milan (IT); Ian Dewi Lang, Milan (IT)

(73) Assignee: PRYSMIAN S.P.A., Milan (IT)

(*) Notice: Subject to any disclaimer, the term of this patent is extended or adjusted under 35 U.S.C. 154(b) by 653 days.

(21) Appl. No.: 14/893,996

(22) PCT Filed: Jun. 6, 2013

(86) PCT No.: PCT/EP2013/061644
§ 371 (c)(1),
(2) Date: Nov. 25, 2015

(87) PCT Pub. No.: WO2014/194949
PCT Pub. Date: Dec. 11, 2014

(65) Prior Publication Data
US 2016/0130180 A1    May 12, 2016

(51) Int. Cl.
*C03C 25/47*   (2018.01)
*C03C 25/1065*   (2018.01)
(Continued)

(52) U.S. Cl.
CPC ........ *C03C 25/109* (2013.01); *C03C 25/1065* (2013.01); *C03C 25/143* (2013.01);
(Continued)

(58) Field of Classification Search
CPC ..................................... C03C 25/47
(Continued)

(56) References Cited

U.S. PATENT DOCUMENTS 5,533,164 A    7/1996   Preston et al.
5,555,335 A *  9/1996   Barker ................ C03C 25/1065
                                                    385/100
(Continued)

FOREIGN PATENT DOCUMENTS

EP       0 521 710       1/1993
EP       0 757 022       2/1997
WO       WO 03/095386    11/2003

OTHER PUBLICATIONS

International Search Report from the European Patent Office for International Application No. PCT/EP2013/061644, dated Nov. 3, 2014.

*Primary Examiner* — Elizabeth A Burkhart
(74) *Attorney, Agent, or Firm* — Finnegan, Henderson, Farabow, Garrett & Dunner LLP

(57) ABSTRACT

A process for manufacturing an optical fibre unit for air-blown installations includes: providing a deposition chamber for applying particulate material, the deposition chamber having an inlet end and an outlet end and a longitudinal axis; passing through the deposition chamber an optical fibre assembly including at least one optical fibre embedded in an inner layer of cured resin material, and having an outer layer around the inner layer, the outer layer including uncured resin material; injecting a flow of fluid and particle material in the chamber in a direction substantially parallel to the chamber longitudinal axis, at an injection speed of 5 m/s at most; perturbing the flow when in the chamber, thus causing the particle material to impact and partially embed into the outer layer of the optical fibre assembly; and curing the outer layer.

19 Claims, 5 Drawing Sheets

(51) Int. Cl.
    *C03C 25/143*     (2018.01)
    *B05D 5/02*     (2006.01)
    *B05D 7/20*     (2006.01)

(52) U.S. Cl.
    CPC ............... *C03C 25/47* (2018.01); *B05D 5/02* (2013.01); *B05D 7/20* (2013.01)

(58) Field of Classification Search
    USPC .................................................. 427/162–169
    See application file for complete search history.

(56) References Cited

U.S. PATENT DOCUMENTS

| | | | |
|---|---|---|---|
| 5,557,703 A | | 9/1996 | Barker et al. |
| 5,851,450 A | * | 12/1998 | Rennie .................. C03C 25/106 264/1.28 |
| 6,022,620 A | * | 2/2000 | Wells .................... G02B 6/4438 385/100 |
| 7,618,676 B2 | | 11/2009 | Barker et al. |
| 2005/0153067 A1 | | 7/2005 | Barker et al. |
| 2007/0169692 A1 | * | 7/2007 | Barker .................... C03C 25/12 118/325 |

* cited by examiner

PROCESS AND APPARATUS FOR MANUFACTURING BLOWN OPTICAL FIBRE UNITS

CROSS REFERENCE TO RELATED APPLICATION

This application is a national phase application based on PCT/EP2013/061644, filed Jun. 6, 2013, the content of which is incorporated herein by reference.

BACKGROUND

The present invention relates to the production of optical fibre units for air-blown installations. More in particular, the present invention relates to a process and apparatus for manufacturing a blown optical fibre unit.

PRIOR ART

Blown fibre installations may comprise ducting or any type of passage along which an optical fibre cable or an optical fibre unit can be blown. Optical fibre assemblies for blown installation are known, for example, from U.S. Pat. No. 5,533,164.

EP0521710 discloses an optical fibre package suitable for blown installation and a method of making an optical fibre package for blown installation in a continuous process.

In known optical fibre units, coated optical fibres (for example, four, in bundles or ribbon, but also a single optical fibre) are contained within a soft inner layer enclosed in an outer harder layer where particulate material (hollow or solid glass beads) is embedded.

EP 0 757 022 discloses an apparatus and method for use in applying particles to an external layer of uncured resin material of a coating of an optical fibre unit comprising at least one optical fibre unit. The apparatus comprises means defining an axially extending through-passage through which, in use, such an optical fibre unit is passed, said passage defining means having an inlet for admitting fluidised particles into said through-passage, and said through-passage being provided with means for generating turbulence in such fluidised particles in said through-passage. Ribs extending circumferentially of the through-passage could be provided. Such ribs define a plurality of axially spaced restrictions in the through-passage for generating turbulence in the fluidised particles which, in use, flow through the through-passage. Since the flow of particles is constrained to make a 90 DEG turn on entering the through-passage, a degree of turbulence is generated in the flow.

U.S. Pat. No. 7,618,676 discloses a fibre unit coating method and apparatus. The apparatus includes a chamber into which an uncured resin coated fibre unit is passed. Microspheres mixed with air are fed into the chamber via ducts and apertures. The system allows controllable application of the microspheres by varying the rate of flow of the air/microsphere mixture. Positive pressure chambers are provided to prevent the microspheres from blocking the inlet and outlet points where the fibre unit enters and leaves the chamber. Overall the flow of gas and microsphere mixture is generally parallel to the fibre. This means that it prevents a significant number of the microspheres from impinging directly onto the fibre at too great a speed. This enables the system to be run at very high speeds, typically between 300-500 m/min.

SUMMARY OF THE INVENTION

In the present description and claims, the term "optical fibre unit for air-blown installation" (or, simply, "blown optical fibre unit" or "optical fibre unit") will be used for indicating one or more of optical fibres contained within a cured inner resin layer which is, in turn, enclosed in a cured outer resin layer where particulate material is embedded.

In the present description and claims, the term "optical fibre assembly" will be used for indicating one or more of optical fibres contained within a cured inner resin layer which is, in turn, enclosed in an outer resin layer (which is to be cured after particulate material/beads embedding).

The embedding of beads into the uncured outer layer should be:
  as uniform as possible along the fibre unit;
  not too deep to cause attenuation and poor surface effect (useful for providing the blown optical fibre unit with the suitable friction to be blown without damages);
  not too shallow to cause beads detachment during the blown operation.

All the above features should be attained in a continuous manufacturing process carried out at an industrially profitable speed and continuity. Also, the apparatus of this process should be suitable for producing blown optical fibre units having different features (e.g. layer thickness, number of optical fibres, bead diameter).

The Applicant has experienced that the manufacturing apparatus of EP 0 757 022 works at slow process speed and needs frequent stops for maintenance for removing precipitated beads. Also, it is suitable for producing blown optical fibre units with a limited outer layer thickness only, as it will be shown in the following of the description.

Tests carried out on a chamber according to U.S. Pat. No. 7,618,676 also revealed other problems, as disclosed hereinbelow.

The Applicant carried out tests on known beading chambers where particulate material is caused to become embedded in the outer resin. It has been noticed that the radial distribution of the speed of the fluid entraining the particulate material injected into the chamber tends to change while travelling therethrough, and, in the exit section of chamber the actual speed of fluid flow close to the travelling optical fibre assembly was seen to be relatively low with respect to the one of the flow near to the chamber wall.

It has been observed that the impact velocity relative to that of the optical fibre assembly was as low as to result in a poor bead coverage (i.e. the number of particles embedded per $mm^2$ of resin surface) of the uncured resin.

The Applicant also noted that the beads have a tendency to lose the kinetic energy appropriate to penetrate the uncured resin layer in time. The bead embedding (i.e. the degree of penetration) seems to deteriorate while increasing the manufacturing speed.

Last, but not least, the Applicant's analysis showed that the production length was limited in a beading chamber according to prior art, because of fluid flow stagnation occurring at the exit portions of the particle deposition chamber. At these positions, the beads fell out of fluid suspension, built up and caused lumps on the optical fibre unit. Therefore, the production run needed to be stopped on a regular basis while beads are removed from these positions.

The Applicant has faced the problem of improving the coverage and embedding of particle material into the outer layer of an optical fibre assembly in a continuous line and of improving the performance of the manufacturing process in terms of speed and reduction of production stops for maintenance. In particular, the Applicant faced the problem of feeding the particle material in the chamber at a flowing speed suitable from an industrial point of view and capable of imparting to the particle material the velocity and kinetic energy proper to provide an optical fibre unit with the low friction feature required by the air-blown installation.

The Applicant found that an effective particle deposition can be obtained by slowing the speed of the fluid entraining the particles into the deposition chamber while causing the particles to enter the deposition chamber with an overall direction substantially parallel to the optical fiber assembly and then to undergo a number of speed changes during their run through the chamber.

In particular, the Applicant has noticed that embedding of beads into the outer layer of an optical fibre unit for air-blown installation could be improved when the particulate material is introduced at a predetermined low speed and through a slanted passage into a deposition chamber which is configured for generating turbulence.

According to a first aspect, the present invention provides a process for manufacturing an optical fibre unit for air-blown installations comprising:

providing a deposition chamber for applying particulate material, said deposition chamber having an inlet end and an outlet end and a longitudinal axis;
  passing through the deposition chamber an optical fibre assembly comprising at least one optical fibre embedded in an inner layer of cured resin material, and having an outer layer around said inner layer, the outer layer comprising uncured resin material;
  injecting a flow of fluid and particle material in said chamber in a direction substantially parallel to the chamber longitudinal axis, at a speed of 5 m/s at most;
  perturbing the flow when in said chamber, thus causing the particle material to impact and partially embed into the outer layer of the optical fibre assembly; and
  curing the outer layer.

Unless otherwise stated, within the present description by fluid speed we mean the average speed of the fluid, or of particle entraining fluid in the relevant duct section.

The process of the invention may comprise protecting a portion of uncured resin of the optical fibre assembly from the injection of the flow at the inlet end. Such a stage is aimed at avoiding the just injected particulate material to impinge on the uncured outer layer at a speed possibly resulting in a too high embedding and an insufficient surface roughness of the final product.

Preferably, the fluid injected together with the particle material is dry compressed air. Advantageously, the compressed air has a dew point of from −30° C. to −38° C.

Preferably, the injection speed of the flow is below 4 m/s, more preferably below 3 m/s. Advantageously, the injection speed is not less than 2 m/s.

The process of the present invention is effective to manufacture optical fibre units having different diameters and bead sizes. In particular, the optical fibre assembly passed through the deposition chamber can have an outer layer with a thickness of from 40 µm to 100 µm, preferably from 50 µm to 70 µm.

The process speed may be from 250 m/min to 300 m/min.

The particle material may be embedded with an embedding of from 20% to 70% to provide a surface roughness of from 80 µm to 150 µm.

According to a second aspect, the present invention relates to an apparatus for manufacturing an optical fibre unit for air-blown installation comprising a deposition chamber for applying particulate material, said chamber having an inlet end, an outlet end, a longitudinal axis, a frusto-conical section at the inlet end and a chamber pipe having a longitudinally changing cross section.

The longitudinal change of chamber pipe cross section may include cross section size change and cross section displacement with respect to the chamber pipe longitudinal axis. Preferably, the inner surface of the chamber pipe comprises cross-section restriction(s) along its longitudinal axis.

The chamber pipe can be made of steel, polytetrafluoroethylene (PTFE) or of an at least partially transparent material, for example glass. The use of a transparent material allows visual inspection of the manufacturing process.

The frusto-conical section at the inlet end is axially converging with respect to the drawing direction.

At least one through-passage for admitting the particulate material into the chamber pipe, having a longitudinal axis substantially perpendicular to chamber longitudinal axis, is connected to the frusto-conical section. Advantageously, two or more through-passages are connected to the frusto-conical section. Advantageously, the two or more through-passages are reciprocally offset in a horizontal plane perpendicular to the longitudinal axis. The offset configuration can impart a rotational motion to the fluid entraining the particulate material.

A tubing for feeding the optical fibre assembly into the chamber pipe, and having a longitudinal axis substantially coincident to the chamber longitudinal axis can have an end inserted into to the frusto-conical section.

Advantageously, an extension for shielding the uncured resin of the optical fibre assembly can be attached to the tubing end into the frusto-conical section. The extension avoids the fluidized particulate material to impinge on the uncured outer layer at a speed possibly resulting in a too high embedding and an insufficient surface roughness of the final product.

Advantageously the deposition chamber has an axially diverging discharge duct.

The number of optical fibres contained within the inner layer of the optical fiber unit could vary. Typically, the optical fibre unit has four optical fibres or, alternatively, the optical fibre unit has twelve optical fibres.

After curing the inner layer has a secant modulus lower than that of the outer layer. Preferably, the secant modulus at 2.5% strain of the inner layer is of from 0.8 to 1.2 Mpa, while the secant modulus at 2.5% strain of the outer layer is of from 656 to 680 Mpa.

Preferably, before application of particulate material, the outer layer substantially consists of uncured resin material.

The particulate material could comprise hollow or solid beads. Solid beads are preferred.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present invention will become more clear from the detailed following description, given by way of example and not of limitation, with reference to the following figures, wherein.

DESCRIPTION OF EMBODIMENTS

Figure 1:
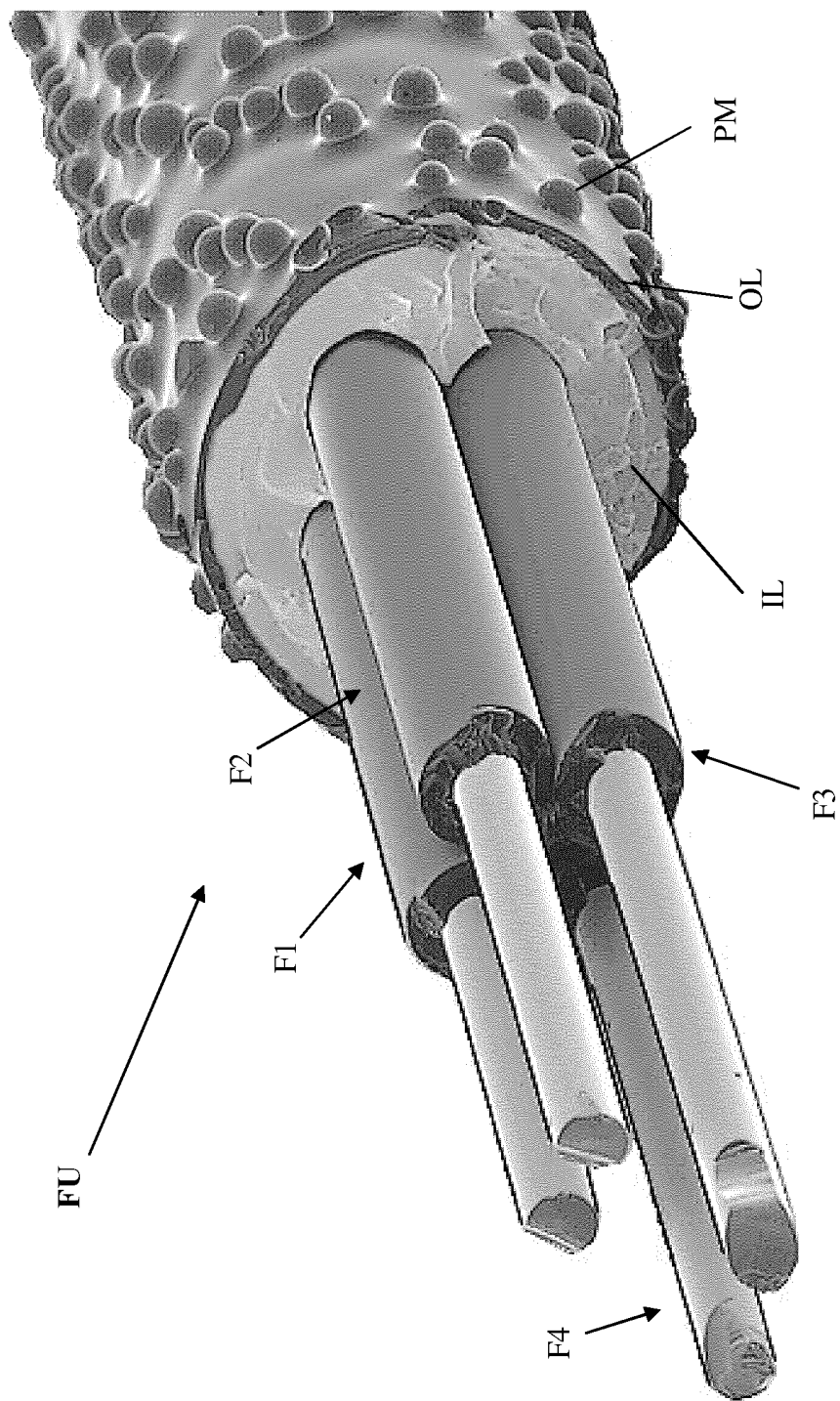
FIG. 1 is a schematic perspective view of a portion of an exemplifying optical fibre unit for air-blown installations.

FIG. 1 is a schematic perspective view of a portion of an optical fibre unit FU for air-blown installations. The optical fibre unit FU comprises a number of optical fibres F1, F2, F3, F4, an inner layer IL which is radially outer to the optical fibres and an outer layer OL which is radially outer to the inner layer IL.

The term "optical fibre" is meant to indicate an optical glass core surrounded by a glass cladding and a coating system comprising one or two layers of cured resins, for example acrylate resins.

The outer layer OL comprises particulate material PM which is partially embedded into the outer layer.

Particulate material can comprise any material which provides low friction when the optical fibre unit FU is blown in a duct.

For example, the particulate material could be selected among beads of glass, of ceramic, of polytetrafluoroethylene (PTFE) or of high-density polyethylene (HDPE). The beads can be either hollow or solid.

The particles of the optical fibre unit manufactured with the process of the invention preferably have a diameter of from 0.070 mm to 0.150 mm, more preferably of from 0.115 mm to 0.125 mm.

The particle material coverage—i.e. the amount of beads per unit surface area of the product—in the optical fibre unit manufactured according to the present process can be of from 15 to 35 beads/mm$^2$.

The embedding is the amount of sinking of the particles into the optical fibre outer layer, expressed as percentage of the particle dimension which is embedded into the outer layer. In the optical fibre unit manufactured with the process of the invention, the embedding of the particle material is of from 20% to 70%, preferably from 20% to 60%. The embedding should be high enough to maintain the particle fixed into the outer layer, but not too much so as to compromise the surface roughness parameter. As a matter of fact, a relatively high surface roughness reduces the friction between the optical fiber unit and the duct during the blowing procedure and increases the ability of the optical fiber unit to be entrained by the air blowing.

The surface roughness (Rz) of the optical fibre unit should be suitable to provide the sought friction for enabling the unit to be installed by air-blown techniques. Surface roughness is connected to the embedding parameter in that the less the particles are embedded, the more the surface of the optical fibre unit is rough and vice versa. The surface roughness can be evaluated by SJ400 surface roughness tester (Mitutoyo Ltd).

Rz (DIN) is the average distance between the highest peak and lowest valley in each sampling length, (ASME Y14.36M—1996 Surface Texture Symbols).

The optical fibre unit manufactured with the process of the invention has a surface roughness Rz of from 80 μm to 150 μm.

Figure 2:
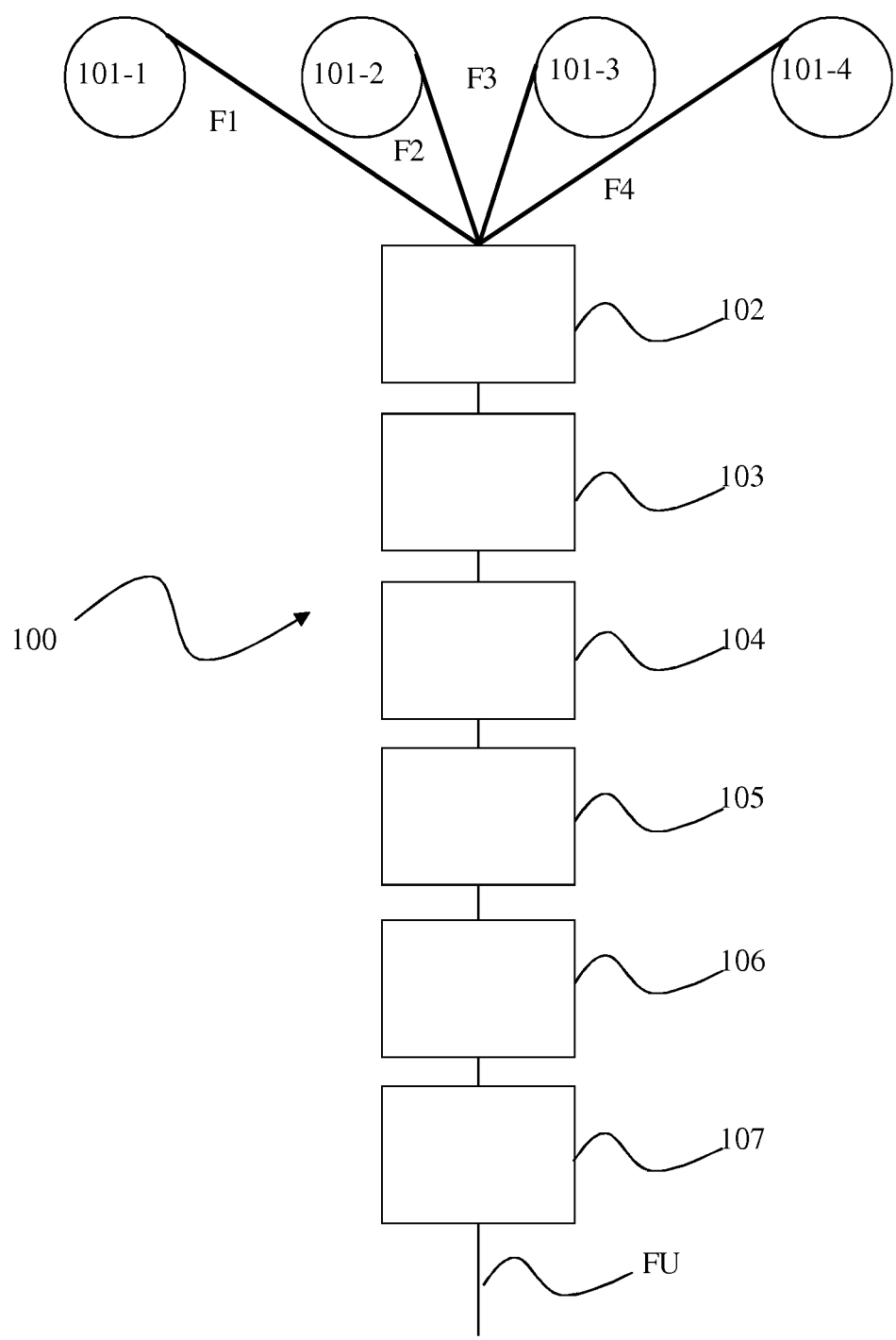
FIG. 2 is a schematic representation of a portion of a manufacturing apparatus for manufacturing an optical fibre unit for air-blown installations.

FIG. 2 is a schematic representation of a portion of a manufacturing apparatus 100 for manufacturing an optical fibre unit FU for air-blown installations according to the present invention.

Four coated optical fibres F1 to F4 are unwound from corresponding reels 101-1 to 101-4 and then grouped at a grouping unit 102.

The apparatus 100 further comprises:
- an inner layer applicator unit 103 which applies inner layer IL to the grouped optical fibres;
- a first curing unit 104 where inner layer is cured;
- an outer layer applicator unit 105 which applies outer layer OL on cured inner layer IL;
- a particulate material applicator unit 106 which applies particulate material PM to the outer layer OL;
- a second curing unit 107 where outer layer OL, provided with particulate material PM is cured.

Profitably, the apparatus 100 allows manufacturing an optical fibre unit FU according to a continuous process.

In embodiments of the invention, the first curing unit 104 operates a curing by ultraviolet radiation. Ultraviolet exposure could be carried out by a "D" lamp type and ultraviolet exposure power could be from about 0.15 to about 0.22 watt/cm$^2$. In embodiments of the invention, it could be approximately 0.19 watt/cm$^2$.

Also second curing unit 107 can operate by ultraviolet radiation. Ultraviolet exposure could be "D" lamp type and ultraviolet exposure power could be from about 0.15 watt/cm$^2$ to about 0.22 watt/cm$^2$. In embodiments of the invention, it could be approximately 0.19 watt/cm$^2$.

Process speed is the speed at which the optical fibres enter the grouping unit 102, which substantially corresponds to the speed at which the optical fibre unit FU exits the apparatus.

The process speed is higher than 100 m/min and can exceed 300 m/min (possibly up to 500 m/min). Preferably, the process speed is between 250 m/min and 300 m/min.

Particulate material applicator unit 106 comprises a deposition chamber through which the optical fibre assembly with uncured outer layer is caused to travel. In the chamber, particulate material is caused to impinge against uncured outer layer and to partially become embedded therein.

Figure 3:
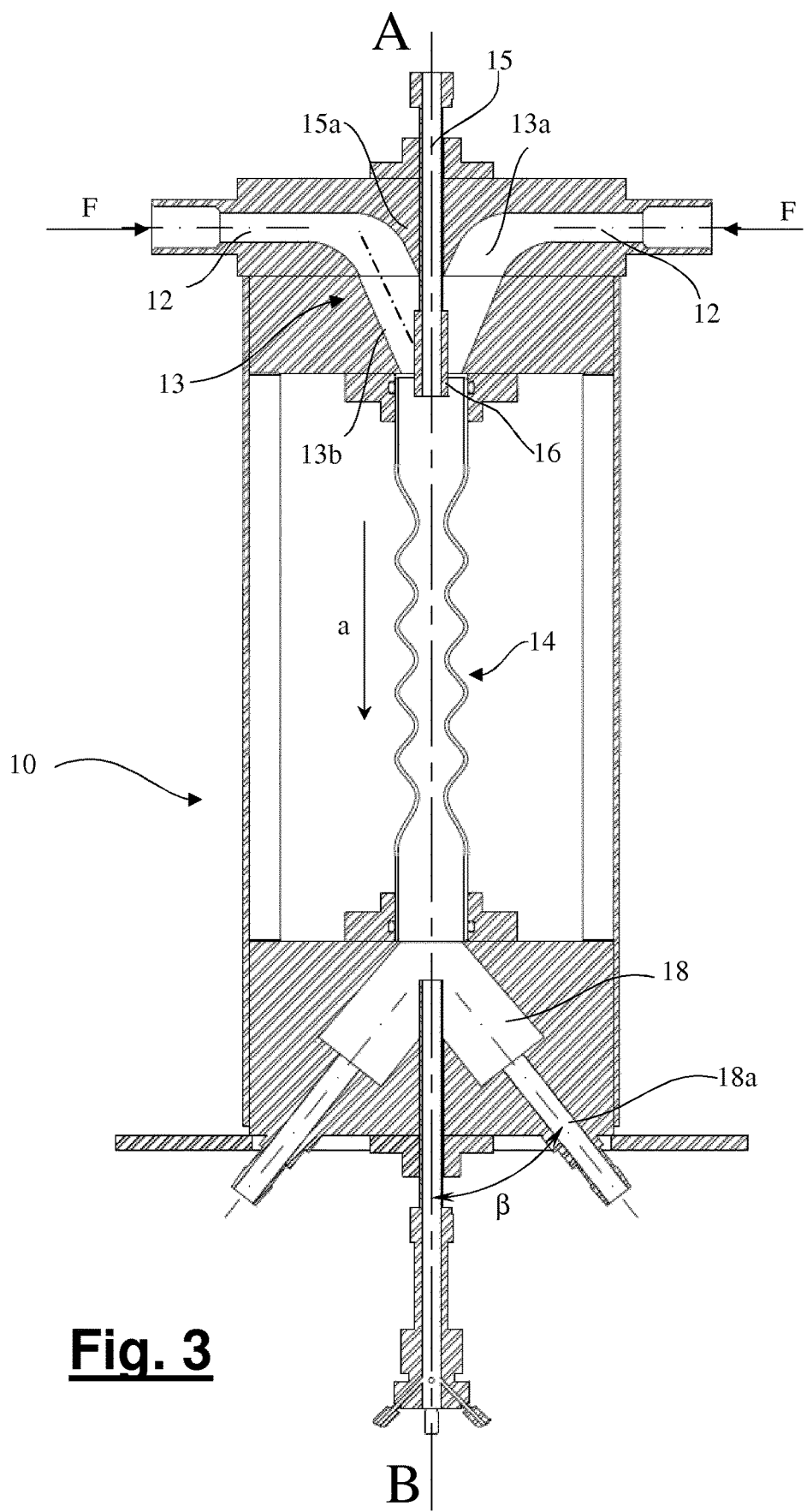
FIG. 3 is a schematic cross-section of a chamber where particulate material is partially embedded into the outer layer according to one embodiment of the present invention.

FIG. 3 shows a deposition chamber 10 according to the present invention. The optical fibre assembly enters the chamber by a tubing 15 inserted into an axially converging frusto-conical section 13 and travels substantially along the chamber longitudinal axis A-B in the direction of the arrow a, which is the drawing direction. As it will be explained in more details, at least one through-passage 12 is provided for the injection of a flow of fluid, for example air, and particulate material into a chamber pipe 14. In the embodiment of FIG. 3, two opposite through-passages 12 offset in the horizontally plane perpendicular to the longitudinal axis A-B are connected to the frusto-conical section 13. In other embodiment (not shown) further flow admitting ducts could be provided.

An extension 16 is preferably provided to the end of the tubing 15 protruding into the frusto-conical section 13. The extension 16 can help to protect the uncured resin matrix at the point of injection where the fluid entraining the particulate material enters into the chamber pipe 14. The extension 16 could be made of metal, such as stainless steel; ceramic or glass.

The chamber 10 according to the present invention further preferably comprises a discharge exit 18 for dismissing the fraction of particulate material which failed to embed into the uncured outer layer. In the embodiment shown in FIG. 3, the discharge exit 18 is a frusto-conical section axially diverging from the drawing direction, having one or more outgoing ducts 18a connected thereto (for example three). Preferably, the discharge exit 18 has surface inclined toward the outlet end by an angle β of 35° to 45°, more preferably by 40° with respect to the longitudinal axis A-B.

Profitably, the chamber pipe 14 is made in a single piece.

The chamber pipe 14 comprises a tubular body having a substantially circular cross-section. This cross section is preferably substantially constant in proximity of the inlet and the outlet ends a, b. Preferably, in its central part, the tubular body has a number of narrowings 14' of its cross section.

Figure 4:
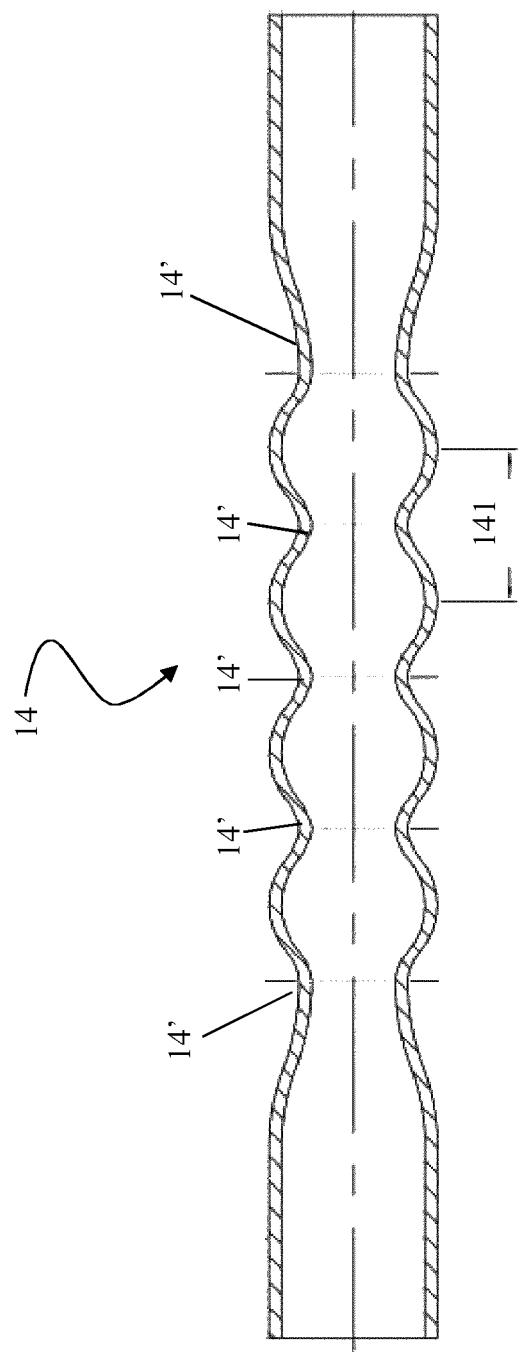
FIG. 4 is an enlarged schematic representation of a chamber core according to one embodiment of the invention.

In the example shown in FIG. 4, the chamber pipe 14 is shown with five annular narrowings 14'.

The narrowings 14' are arranged according to a pitch 141 which is substantially constant. The pitch 141 could be substantially equal to the inner diameter of chamber pipe at its inlet and outlet ends.

For example, the inner diameters at the inlet and outlet ends are of 0.26 mm and the pitch 141 is of 0.27 mm.

The profile of the central part of chamber pipe of FIG. 4, when seen in longitudinal cross-section, is shaped in form of sinusoid, where sharp edges are preferably avoided.

Figure 5:
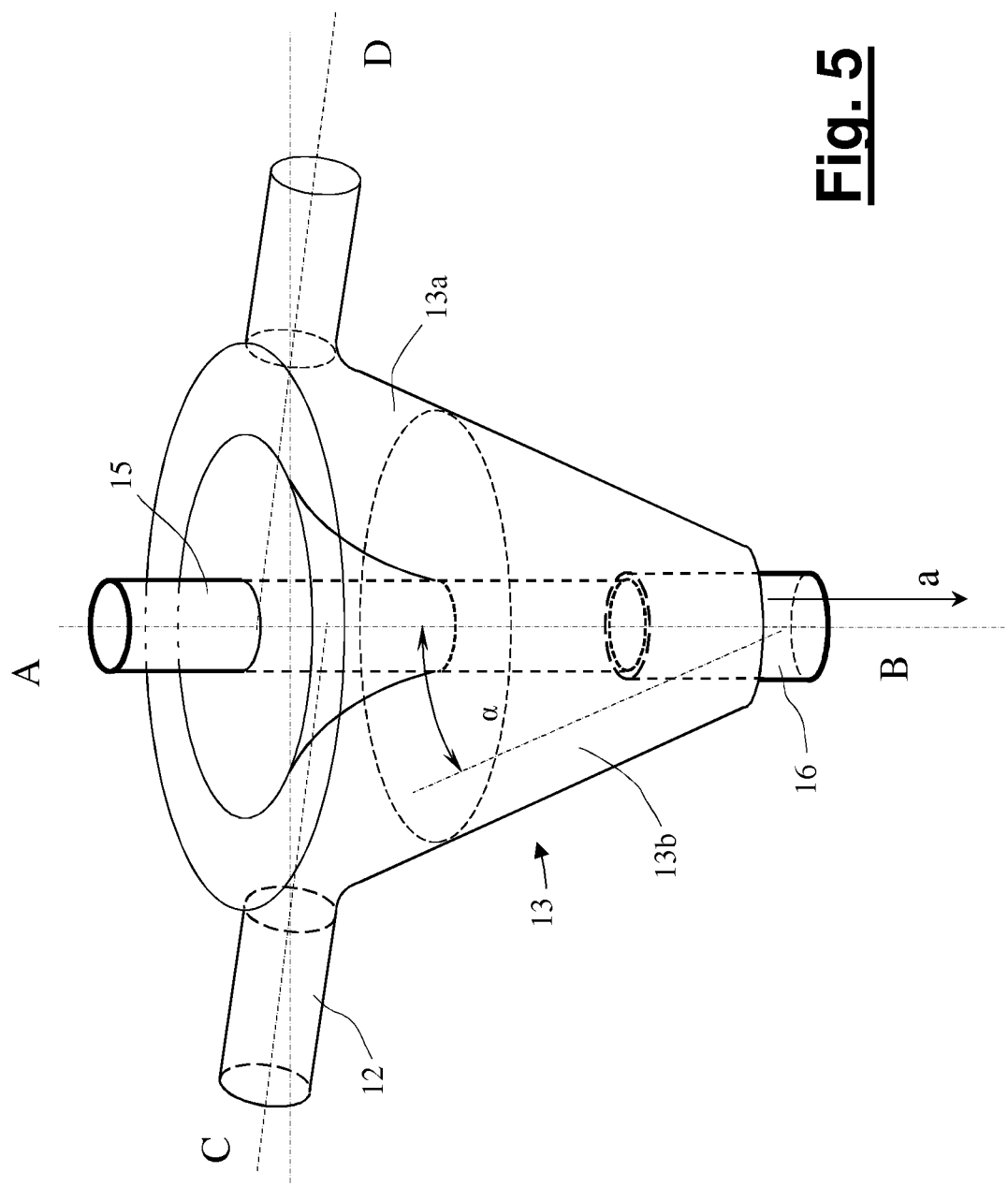
FIG. 5 shows a particular of the frusto-conical section at the inlet end of an apparatus according to the present invention.

Having reference to FIG. 5, the configuration of the fluid entrance portion will be further detailed. Each through-passage 12 has a respective longitudinal axis C, D substantially perpendicular to the longitudinal axis A-B. The frusto-conical section 13 has a surface inclined by angle α of from 15° to 45°, preferably of about 36° with respect to longitudinal axis A-B.

The frusto-conical section 13 comprises an upper portion 13a and a lower portion 13b. The upper portion 13a is a substantially toroidal volume defined by the outer surface of the frusto-conical section 13 and the surface of the conical insert 15a coaxially inserted therein.

In the depicted embodiment, the tubing 15 protrudes of about 10.5 mm into the frusto-conical section 13, and it is provided with a 35 mm-long extension 16, protruding of 5.5 mm beyond the bottom of the frusto-conical section 13.

Preferably, the two through-passages 12 are diametrically offset, so as to impart a rotational motion to the fluid.

When the fluid entraining the particulate material flows from the through-passages 12 in to the toroidal upper portion 13a of the frusto-conical section 13, it enters in a zone having increased transversal area and, thereafter, the fluid speed is progressively accelerated while flowing downstream.

Such a speed change is conducive to produce a fluid vortex in the direction of the fibre unit movement.

The Applicant carried out production tests on diverse deposition chambers to evaluate process and product parameters. In all of the test runs the particulate material was solid glass beads having an average diameter of 0.12 mm. The results are set forth in Table 1.

TABLE 1

| Parameter | Chamber assy 1* | Chamber assy 2* | Chamber assy 3 |
|---|---|---|---|
| Maximum production length | 18 km | 12 km | 150 km |
| Process speed | 150 m/min | 300 m/min | 300 m/min |
| Fluid injection speed | 4 m/s | 4 m/s | 2.3 m/s |
| Bead embedding | <20% | 89% | 40% |
| Surface roughness (Rz) | >60 μm | 70 μm | 120 μm |

Chamber assembly 1 (comparative) included an axially extended passage with a substantially radial fluid inlet, with diameter of 18 mm and length 32 mm, followed by a chamber pipe having inner diameter of about 25 mm and length of about 235 mm and including 5 evenly spaced restrictions with inner diameter of about 15 mm, substantially corresponding to the chamber assembly disclosed in FIG. 3 of the already mentioned EP 0 757 022.

Chamber assembly 2 (comparative) was substantially similar to the one disclosed by the already mentioned U.S. Pat. No. 7,618,676, FIG. 8 and included a frusto-conical input cavity with input diameter of 59 mm+/−1 mm, length of 67 mm+/−1 mm and output diameter of 26 mm+/−1 mm, followed by a cylindrical pipe having a constant diameter of about 25 mm and length of about 235 mm; the fluid inlets had a substantially input radial direction and were curved with a final outlet with axis parallel to the fiber path.

Chamber assembly 3 was according to an embodiment of the invention and included a frusto-conical input cavity with input diameter 59 mm+/−1 mm, length 67 mm+/−1 mm and output diameter 26 mm+/−1 mm, followed by a chamber pipe having inner diameter of about 25 mm and length of about 235 mm and including 5 evenly spaced restrictions with inner diameter of about 15 mm.

As for comparative Chamber assembly 1, a limited length of optical fibre unit was manufactured before stop due to apparatus maintenance (cleaning) requirements, and the process speed had to be limited to 150 m/min. The optical fibre assembly tested had a satisfactory surface roughness at the test speed of 150 m/min with an outer layer 30 μm thick.

When the thickness of the outer layer was changed to 60 μm while maintaining the process speed at 150 m/min, the resulting fibre unit showed a low surface roughness (<50 μm, due to excessive bead embedding), unsuitable for the air blown installation and an excessive bead coverage (>40 beads/mm$^2$), making the product unacceptably brittle. This negative outcome was independent from the injection speed imparted to fluid.

Making the apparatus to run at 300 m/min with an outer layer 60 μm thick, the resulting product showed a bead coverage <10 beads/mm$^2$, insufficient for the air blown installation, when the fluid injection speed was of 2-3 m/s. When the fluid injection speed was of 4 m/s or more the resulting product showed an excessive bead embedding (>90%), negatively affecting the surface roughness.

Summarizing, an apparatus comprising Chamber assembly 1, besides working at slow process speed and frequent maintenance stops, cannot be used for producing optical fibre unit with an outer layer thickness greater than 30 μm.

As for comparative Chamber assembly 2, a stop for apparatus maintenance due to lumps formation was necessary after the production of 12 km of optical fibre unit.

The outer layer of the optical fibre assembly used in this chamber had a thickness of 100 μm.

The resulting surface roughness was satisfactory, but the bead embedding was too high (89%) and resulted in a very brittle product not passing the 40 mm bend test according to IEC 60794-1-2 Ed 2.

The deposition process in comparative Chamber assembly 2 was also evaluated by a Computational Fluid Dynamics (CFD) study. A fluid comprising air and particulate material (beads) was injected into the deposition chamber at a 4 m/s speed and reached a speed of 90 m/s in the vicinity of the exit of the cylindrical pipe, causing the most of the bead impacts on the optical fiber assembly to happen in the second half of the cylindrical pipe. This uneven speed profile along the chamber resulted in a poor bead coverage in the chamber portion closer to the inlet. Also a too deep impact was observed.

To improve the local coverage it was tried to increase the fluid injection speed; unfortunately, this caused deeper embedding of the particles.

In addition, fluid flow stagnation occurred near the inlet and outlet ends of the deposition chamber, where the particulate material fell out of fluid suspension and adhered to the optical fibre assembly, causing lumps thereon.

The process of the invention was applied in testing Chamber assembly 3.

Spans of optical fibre units much longer than those produced with the comparative processes and chambers were manufactured before maintenance stop (150 km). The outer layer of the optical fibre assembly used in this chamber had a thickness of 60 μm.

The resulting product showed a particle embedding of 40%, such as to provide a surface roughness of 120 μm, ensuring the optical fibre unit an efficient behaviour during the blowing procedure.

Also the local bead coverage was satisfying and the product passed the 40 mm bend test.

The invention claimed is:

1. A process for manufacturing an optical fibre unit for air-blown installations comprising:
   providing a deposition chamber for applying particulate material, the deposition chamber having an inlet end and an outlet end, a longitudinal axis, and a chamber pipe with a central part having a longitudinally changing cross section, wherein the central part of the chamber pipe does not have sharp edges;
   passing through the chamber pipe an optical fibre assembly comprising at least one optical fibre embedded in an inner layer of cured resin material, and having an outer layer around the inner layer, the outer layer comprising uncured resin material;
   injecting a flow of fluid and particle material in the deposition chamber in a direction substantially parallel to the chamber longitudinal axis, at an injection speed of below 4 m/s;
   perturbing the flow when in the chamber pipe, thus causing the particle material to impact and partially embed into the outer layer of the optical fibre assembly; and
   curing the outer layer.

2. The process according to claim 1, comprising protecting a portion of uncured resin of the optical fibre assembly from injection of the flow.

3. The process according to claim 1, wherein the injection speed of the flow is below 3 m/s.

4. The process according to claim 1, wherein the optical fibre assembly passed through the chamber pipe has an outer layer with a thickness from 40 μm to 100 μm.

5. The process according to claim 4, wherein the thickness of the outer layer is from 50 μm to 70 μm.

6. The process according to claim 1, having a process speed of 250 m/min to 300 m/min.

7. The process according to claim 1, wherein the particulate material is embedded with an embedding of the particle material from 20% to 70% to provide a surface roughness of from 80 to 150 μm.

8. The process according to claim 1, wherein the longitudinally changing cross section of the central part of the chamber pipe has the form of a sinusoid.

9. The process according to claim 1, wherein the central part of the chamber pipe comprises a tubular body having a number of narrowings of its cross section.

10. The process according to claim 9, wherein the narrowings are arranged according to a pitch that is substantially constant, wherein the pitch is substantially equal to the inner diameter of an inlet and an outlet of the chamber pipe.

11. A process for manufacturing an optical fibre unit for air-blown installations comprising:
    providing a deposition chamber for applying particulate material, the deposition chamber having an inlet end and an outlet end, a longitudinal axis, a frusto-conical section at the inlet end, and a chamber pipe with a central part having a longitudinally changing cross section, wherein the longitudinally changing cross section of the central part of the chamber pipe has the form of a sinusoid;
    passing through the chamber pipe an optical fibre assembly comprising at least one optical fibre embedded in an inner layer of cured resin material, and having an outer layer around the inner layer, the outer layer comprising uncured resin material;
    injecting a flow of fluid and particle material in the deposition chamber in a direction substantially parallel to the chamber longitudinal axis, at an injection speed of below 4 m/s;
    perturbing the flow when in the chamber pipe, thus causing the particle material to impact and partially embed into the outer layer of the optical fibre assembly; and
    curing the outer layer.

12. The process according to claim 11, comprising protecting a portion of uncured resin of the optical fibre assembly from injection of the flow.

13. The process according to claim 11, wherein the injection speed of the flow is below 3 m/s.

14. The process according to claim 11, wherein the optical fibre assembly passed through the chamber pipe has an outer layer with a thickness from 40 μm to 100 μm.

15. The process according to claim 14, wherein the thickness of the outer layer is from 50 μm to 70 μm.

16. The process according to claim 11, having a process speed of 250 m/m to 300 m/min.

17. The process according to claim 11, wherein the particulate material is embedded with an embedding of the particle material from 20% to 70% to provide a surface roughness of from 80 to 150 μm.

18. The process according to claim 11, wherein the central part of the chamber pipe comprises a tubular body having a number of narrowings of its cross section.

19. The process according to claim 18, wherein the narrowings are arranged according to a pitch that is substantially constant, wherein the pitch is substantially equal to the inner diameter of an inlet and an outlet of the chamber pipe.

* * * * *